(12) United States Patent
Draznin et al.

(10) Patent No.: US 11,057,810 B2
(45) Date of Patent: *Jul. 6, 2021

(54) PACKET DATA NETWORK GATEWAY HANDOFF

(71) Applicants: Verizon Patent and Licensing Inc., Arlington, VA (US); Cellco Partnership, Arlington, VA (US)

(72) Inventors: Sagiv Draznin, Walnut Creek, CA (US); Lalit R. Kotecha, San Ramon, CA (US); Patricia R. Chang, San Ramon, CA (US); Deepak Kakadia, Santa Clara, CA (US); Arda Aksu, Martinez, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 141 days.

This patent is subject to a terminal disclaimer.

(21) Appl. No.: 16/158,848

(22) Filed: Oct. 12, 2018

(65) Prior Publication Data
US 2019/0045410 A1    Feb. 7, 2019

Related U.S. Application Data

(63) Continuation of application No. 15/085,365, filed on Mar. 30, 2016, now Pat. No. 10,142,900.

(60) Provisional application No. 62/144,030, filed on Apr. 7, 2015.

(51) Int. Cl.
*H04W 36/12*    (2009.01)
*H04W 88/16*    (2009.01)

(52) U.S. Cl.
CPC ............ *H04W 36/12* (2013.01); *H04W 88/16* (2013.01)

(58) Field of Classification Search
CPC ............................ H04W 36/12; H04W 88/16
See application file for complete search history.

(56) References Cited

U.S. PATENT DOCUMENTS

| | | | | |
|---|---|---|---|---|
| 7,689,221 B1* | 3/2010 | Gazzard | .................. | H04L 47/10 455/436 |
| 8,254,331 B2* | 8/2012 | Vargantwar | ......... | H04W 36/385 370/331 |
| 2007/0129088 A1* | 6/2007 | Gao | ...................... | H04W 36/24 455/464 |
| 2008/0026756 A1* | 1/2008 | Harris | ................... | H04W 36/02 455/436 |
| 2011/0092210 A1* | 4/2011 | Kumar | ............ | H04W 36/00835 455/436 |
| 2011/0116470 A1* | 5/2011 | Arora | .................... | H04W 36/30 370/331 |
| 2012/0063300 A1 | 3/2012 | Sahin | | |

(Continued)

*Primary Examiner* — Andrew Lai
*Assistant Examiner* — M Mostazir Rahman

(57) ABSTRACT

A device may determine that a user device, connected to a first packet data network gateway (PGW) associated with a first area, is located in a second area associated with a second PGW. The first PGW may be associated with a provider network. The second PGW may be associated with the provider network. The user device may not be connected to the second PGW. The device may cause the user device to be disconnected from the first PGW and connected to the second PGW. The user device may remain connected to the provider network when disconnecting from the first PGW and connecting to the second PGW.

20 Claims, 12 Drawing Sheets

(56) References Cited

U.S. PATENT DOCUMENTS

| | | | | |
|---|---|---|---|---|
| 2013/0138814 A1* | 5/2013 | Kotecha | ............... | H04L 67/10 |
| | | | | 709/226 |
| 2013/0265989 A1* | 10/2013 | Gazzard | ............... | H04W 28/14 |
| | | | | 370/331 |
| 2014/0328190 A1* | 11/2014 | Lord | ............... | H04W 24/08 |
| | | | | 370/252 |
| 2015/0200735 A1 | 7/2015 | Tjahjono | | |
| 2016/0212675 A1* | 7/2016 | Choi | ............... | H04W 36/32 |

* cited by examiner

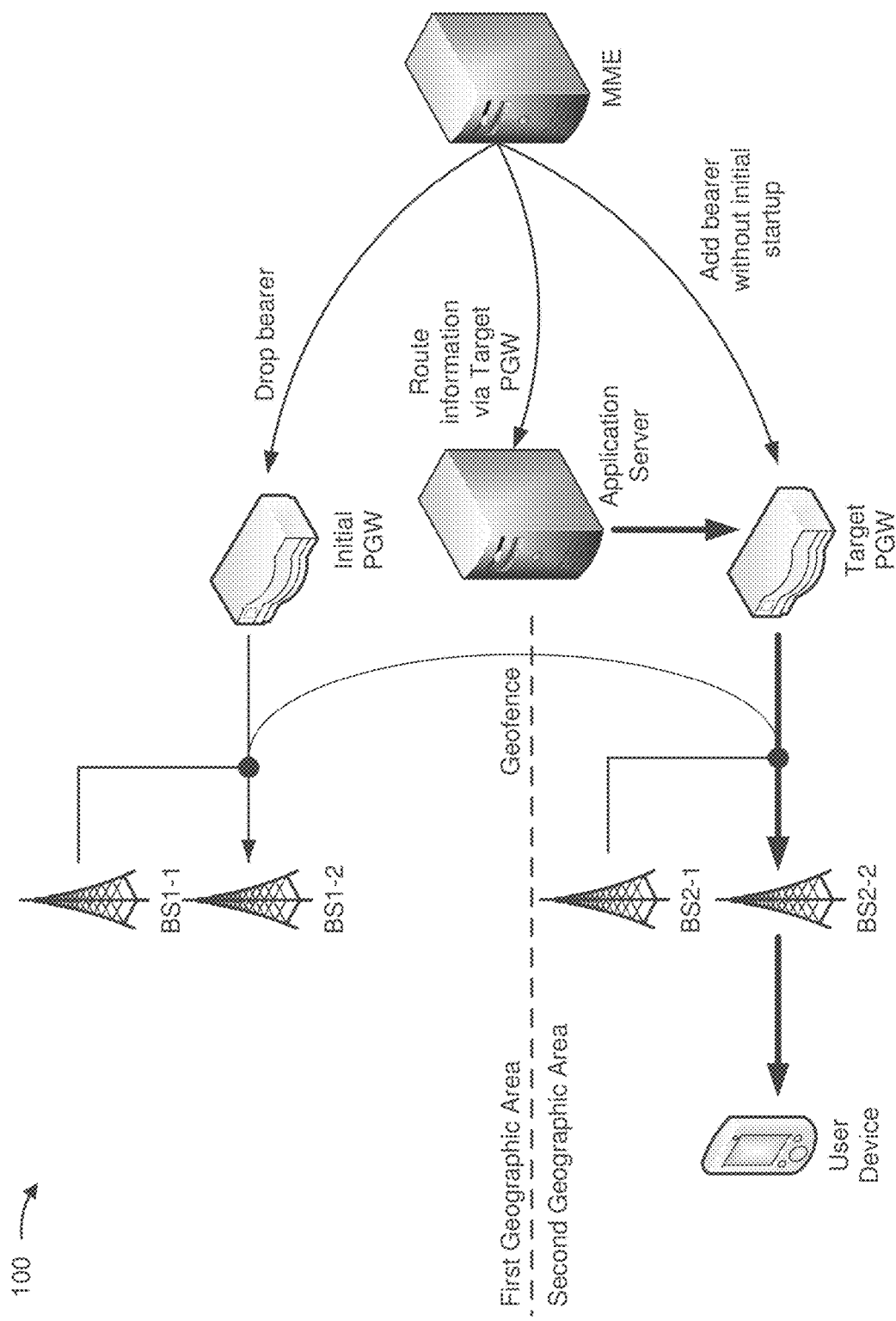

PACKET DATA NETWORK GATEWAY HANDOFF

RELATED APPLICATIONS

This application is a continuation of U.S. patent application Ser. No. 15/085,365, filed on Mar. 30, 2016, which claims priority under 35 U.S.C. § 119 to U.S. Provisional Patent Application No. 62/144,030, filed on Apr. 7, 2015, the content contents of which are incorporated by reference herein in their entirety.

BACKGROUND

A packet data network gateway (PGW) may provide connectivity between a user device and a packet data network. A particular PGW may be utilized for providing connectivity to a set of user devices in a particular area. Upon start-up, a user device may determine which PGW, of a set of PGWs, is associated with serving the particular area in which the user device is located.

BRIEF DESCRIPTION OF THE DRAWINGS

FIGS. 1A-1C are diagrams of an overview of an example implementation described herein;

DETAILED DESCRIPTION OF PREFERRED EMBODIMENTS

The following detailed description of example implementations refers to the accompanying drawings. The same reference numbers in different drawings may identify the same or similar elements.

A provider network (e.g., a network associated with a wireless service provider) may service user devices across a geographic area. The provider network may utilize multiple base stations to provide wireless connectivity to the user devices across the geographic area. The provider network may include multiple packet data network gateways (PGWs), each with an assigned portion of the geographic area. During an initial start-up by a user device, a mobility management entity (MME) may select a particular PGW, of a set of provider network PGWs, associated with a particular portion of the geographic area at which the user device is located. The MME may cause the user device to connect to the particular PGW based on selecting the particular PGW.

However, while the user device remains connected to the provider network, the user device may be moved to another portion of the geographic area that is associated with another PGW of the set of PGWs. When the user device is moved to the other portion of the geographic area, the user device may remain connected to the particular PGW as long as the user device does not lose connectivity with the provider network (e.g., by shutting down, by entering a non-connective "airplane mode," or the like). By maintaining a connection to the particular PGW, data may be routed an excessive distance across an excessive quantity of network nodes, thereby introducing the possibility of network performance degradation, such as by latency, lost packets, or the like. Implementations, described herein, may facilitate a handoff from an initial PGW to a target PGW when the user device is re-located from a first location associated with the initial PGW to a second location associated with the target PGW.

Figure 1A:
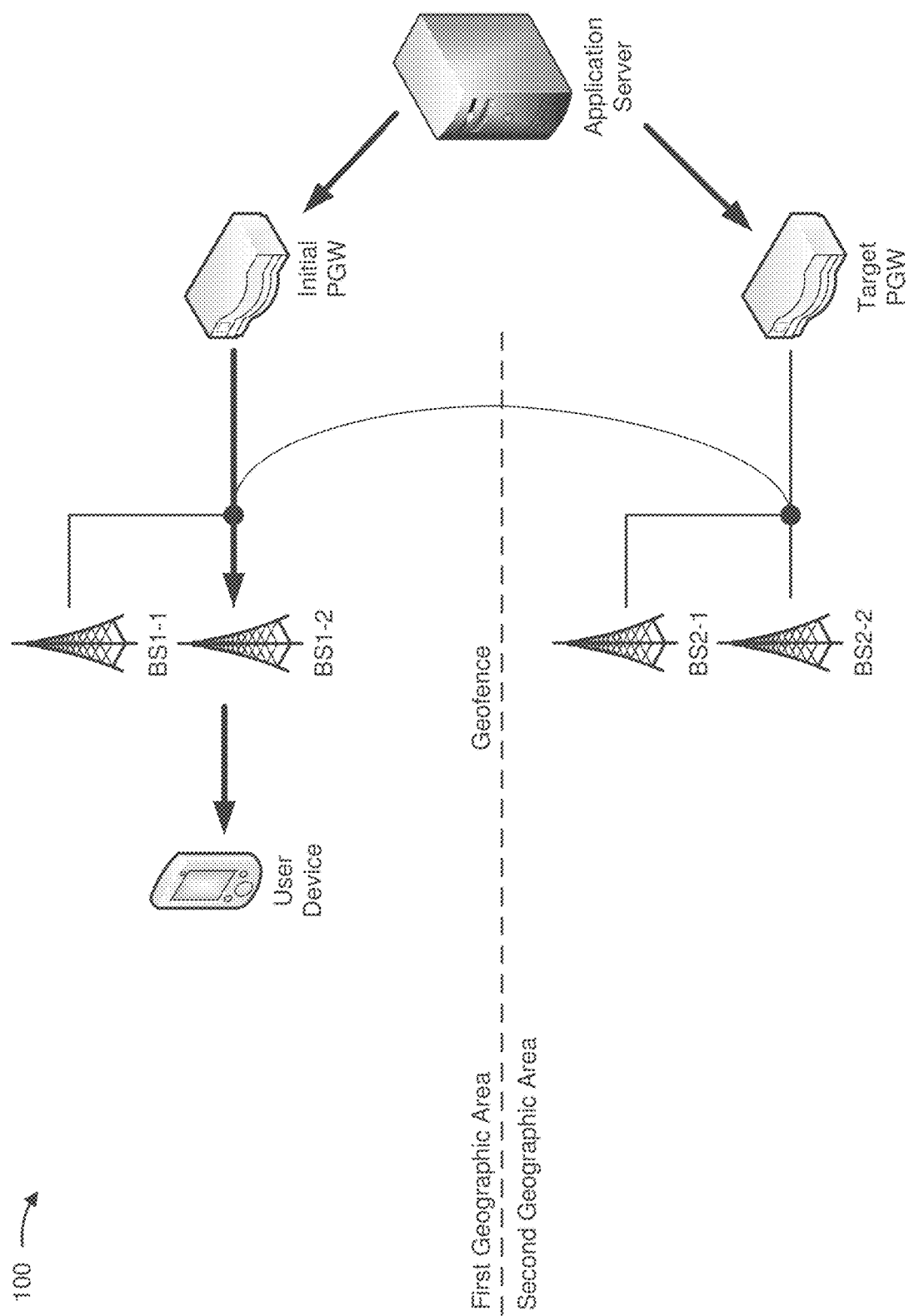
Figure 1B:
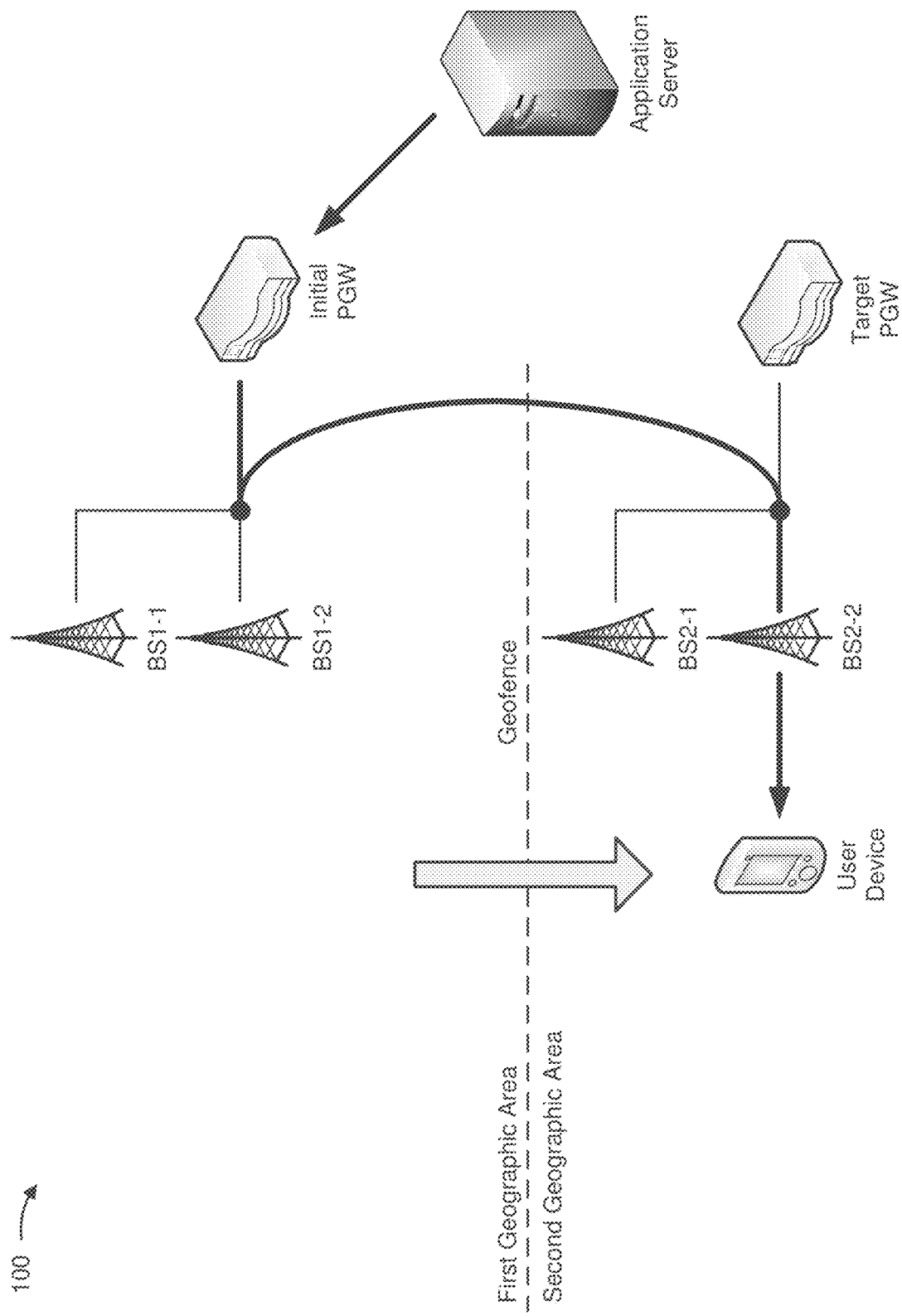

FIGS. 1A-1C are diagrams of an overview of an example implementation 100 described herein. As shown in FIG. 1A, a user device may be located in a first geographic area that includes an initial PGW and a first set of base stations (e.g., "BS1-1" and "BS1-2"). The first geographic area may be separated by a geo-fence (e.g., a demarcation of a boundary of a geographic area) from a second geographic area. The second geographic area may include a target PGW and a second set of base stations (e.g., "BS2-1" and "BS2-2"). An application server (e.g., "App Server") may provide data to and/or receive data from the user device via the initial PGW and base station BS1-2.

As shown in FIG. 1B, the user device may be moved from the first geographic area to the second geographic area. Based on being moved from the first geographic area to the second geographic area, the user device may undergo a base station handoff from base station BS1-2 to base station BS2-2. When the base station handoff is complete, the application server may provide data to and/or receive data from the user device via the initial PGW and base station BS2-2. In so doing, the data from the application server is routed to the initial PGW in the first geographic location and re-routed to the base station BS2-2 in the second geographic location.

As shown in FIG. 1C, an MME may determine that the user device crossed the geo-fence when being moved from the first geographic area to the second geographic area and may trigger a PGW handoff while the user device remains connected to a provider network associated with the MME. The MME may cause the initial PGW to drop a first bearer (i.e., a first radio bearer) associated with providing connectivity between the user device and a packet data network (PDN) associated with the application server. The MME may cause the target PGW to establish a second bearer associated with providing connectivity between the user device and the PDN associated with the application server. For example, the MME may instruct the target PGW to undergo initial connection procedures with the user device to establish the second bearer although the user device is already connected to the provider network. The MME may instruct the application server that data, which is provided to the user device, is to be provided via the target PGW. The data from the application server is routed to the target PGW in the second geographic area and the base station BS2-2 in the second geographic area. In this way, data need not be routed over an excessive distance to a geographic area that is no longer associated with the user device, thereby improving network performance. Additionally, by ensuring that the user device is connected to a PGW associated with the geographic area in which the user device is located, network signaling may be reduced, services may be localized to the user device's geographic area more easily, troubleshooting of network problems may be simplified, or the like.

Figure 2:
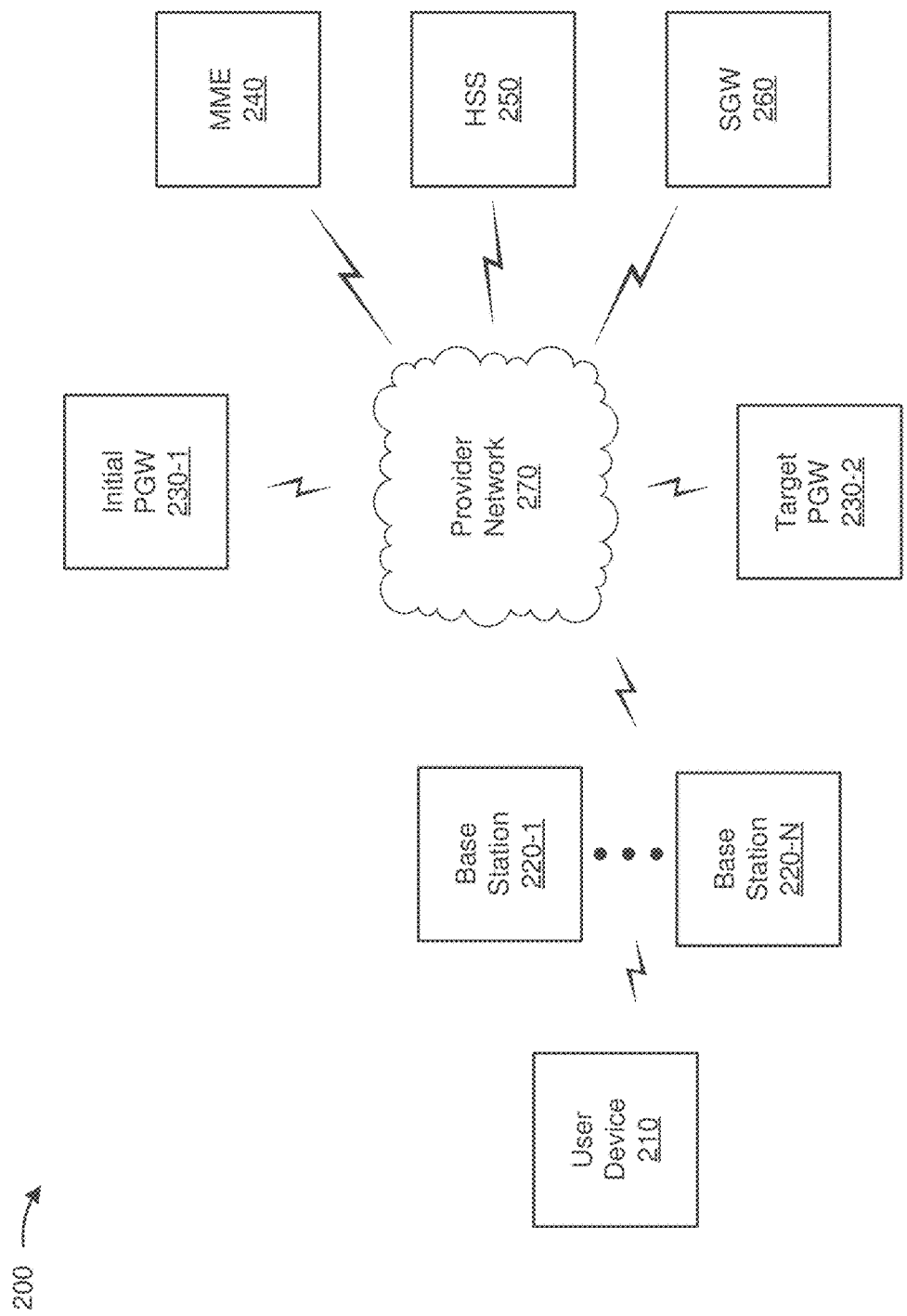
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, one or more base stations 220-1 through 220-N (N≥1) (hereinafter referred to collectively as "base stations 220," and individually as "base station 220"), two or more PGWs 230 (e.g., an initial PGW 230-1, a target PGW 230-2, or the like), an MME 240, a home subscriber server (HSS) 250, a serving gateway (SGW) 260, and/or a provider network 270. Devices of environment 200 may interconnect via wired connections, wireless connections, or a combination of wired and wireless connections.

User device 210 may include one or more devices capable of receiving, generating, storing, processing, and/or providing information. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 may receive information from and/or transmit information to another device in environment 200.

Base station 220 may include one or more devices capable of communicating with user device 210 using a cellular radio access technology. For example, base station 220 may include a base transceiver station, a radio base station, a node B, an evolved node B (eNB), a base station subsystem, a cellular site, a cellular tower (e.g., a cell phone tower, a mobile phone tower, etc.), a radio access node, a macrocell base station, a microcell base station, a picocell base station, a femtocell base station, or a similar type of device. Base station 220 may transfer traffic between user device 210 and provider network 270 and/or one or more other networks via PGW 230. In some implementations, base station 220 may communicate with user device 210 (and/or one or more other devices) using radio waves.

PGW 230 (e.g., initial PGW 230-1, target PGW 230-2, or the like) may include one or more devices capable of providing connectivity for user device 210 to an external packet data network (PDN). For example, PGW 230 may include one or more data processing and/or traffic transfer devices, such as a gateway, a router, a modem, a switch, a firewall, a network interface controller (NIC), a hub, a bridge, a server device, an optical add-drop multiplexer (OADM), or any other type of device that processes and/or transfers traffic. In some implementations, PGW 230 may aggregate traffic received from one or more SGWs 260, and may send the aggregated traffic to a PDN. Additionally, or alternatively, PGW 230 may receive traffic from a PDN, and may send the traffic to user device 210 via SGW 260 and base station 220. In some implementations, PGW 230 may record data usage information (e.g., byte usage), and may provide the data usage information to an authentication, authorization, and accounting server.

MME 240 may include one or more devices, such as one or more server devices, capable of managing authentication, activation, deactivation, and/or mobility functions associated with user device 210. In some implementations, MME 240 may perform operations relating to authentication of user device 210. Additionally, or alternatively, MME 240 may facilitate the selection of a particular SGW 260 and/or a particular PGW 230 to serve traffic to and/or from user device 210. MME 240 may perform operations associated with handing off user device 210 from a first base station 220 to a second base station 220 when user device 210 is transitioning from a first cell associated with the first base station 220 to a second cell associated with the second base station 220. Additionally, or alternatively, MME 240 may select another MME (not pictured), to which user device 210 should be handed off (e.g., when mobile device 205 moves out of range of MME 240). In some implementations, MME 240 may determine information identifying PGWs 230 associated with geographic areas, and may select target PGW 230 to which a user device 210 is to be handed over to from initial PGW 230 when user device 210 is moving from a first geographic area associated with initial PGW 230 to a second geographic area associated with target PGW 230.

HSS 250 may include one or more devices, such as one or more server devices, capable of managing (e.g., receiving, generating, storing, processing, and/or providing) information associated with user device 210. For example, HSS 250 may manage subscription information associated with user device 210, such as information that identifies a subscriber profile of a user associated with user device 210, information that identifies services and/or applications that are accessible to user device 210, location information associated with user device 210, a network identifier (e.g., a network address) that identifies user device 210, information that identifies a treatment of user device 210 (e.g., quality of service information, a quantity of minutes allowed per time period, a quantity of data consumption allowed per time period, etc.), and/or similar information. HSS 250 may provide this information to one or more other devices of environment 200 to support the operations performed by those devices.

SGW 260 may include one or more devices capable of routing packets. For example, SGW 260 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may transfer traffic associated with a long term evolution (LTE) network, an evolved packet core (EPC), an Internet protocol (IP) multimedia subsystem (IMS) core, or the like. Additionally, or alternatively, SGW 220 may perform operations associated with handing off user device 210 to and/or from an LTE network.

Provider network 270 may include one or more wired and/or wireless networks. For example, provider network 270 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
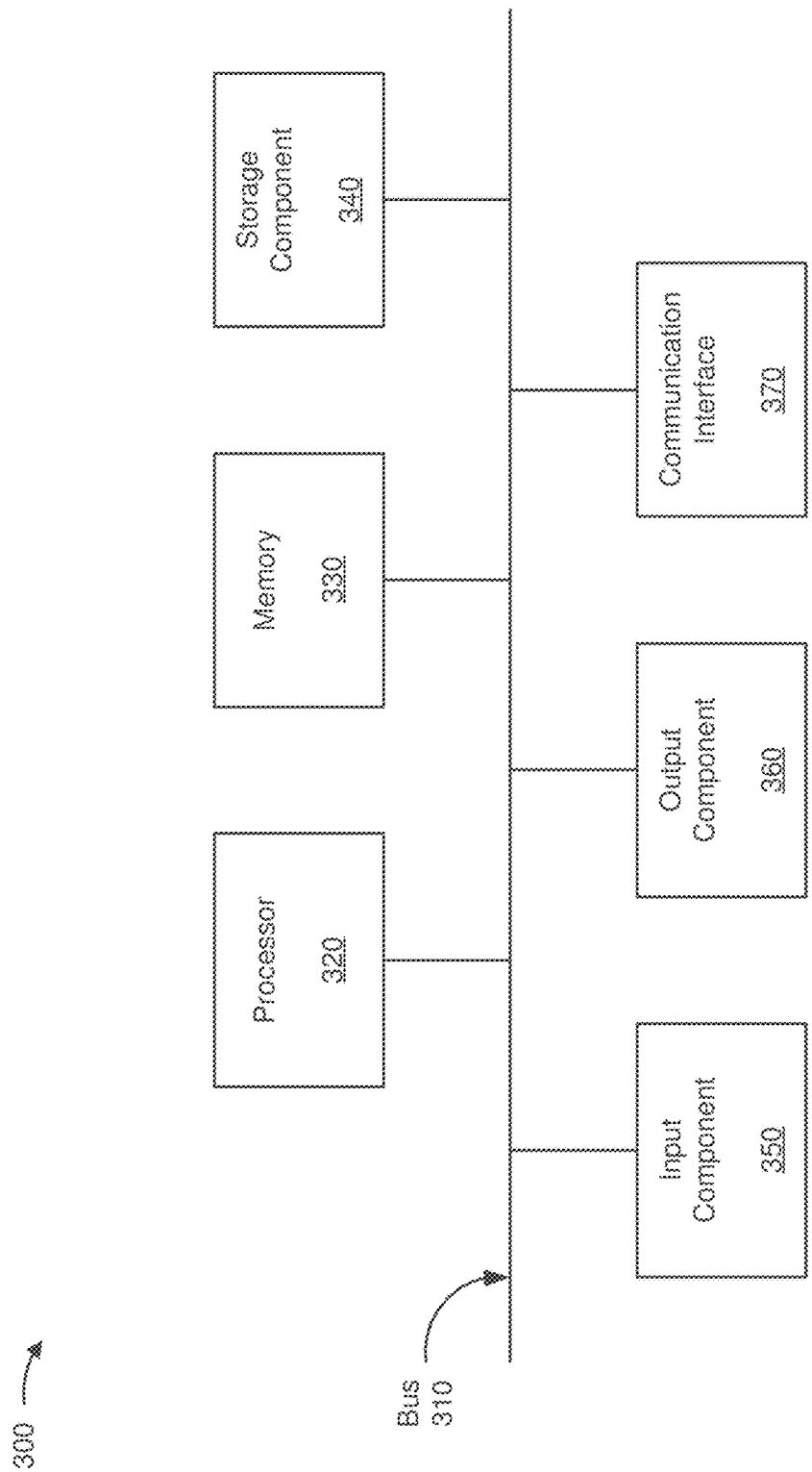
FIG. 3 is a diagram of example components of one or more devices of FIG. 2.

FIG. 3 is a diagram of example components of a device 300. Device 300 may correspond to user device 210, base station 220, PGW 230, MME 240, HSS 250, and/or SGW 260. In some implementations, user device 210, base station 220, PGW 230, MME 240, HSS 250, and/or SGW 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
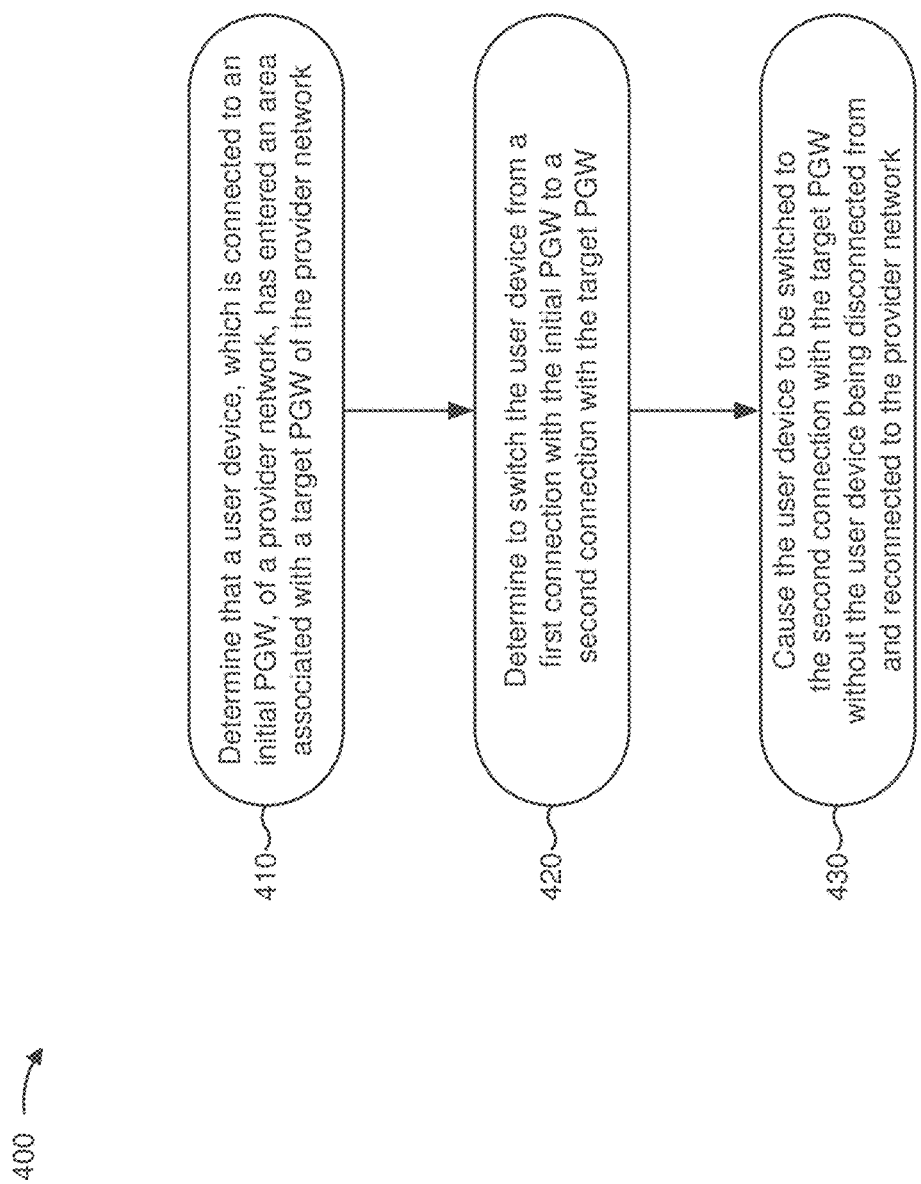
FIG. 4 is a flow chart of an example process for managing a packet data network gateway handoff.

FIG. 4 is a flow chart of an example process 400 for managing a PGW handoff. In some implementations, one or more process blocks of FIG. 4 may be performed by MME 240. Additionally, or alternatively, one or more process blocks of FIG. 4 may be performed by another device or a set of devices separate from or including MME 240, such as user device 210, base station 220, PGW 230, HSS 250, and/or SGW 260.

As shown in FIG. 4, process 400 may include determining that a user device, which is connected to an initial PGW of a provider network, has entered an area associated with a target PGW of the provider network (block 410). For example, MME 240 may determine that user device 210 has been moved from a first area associated with initial PGW 230 to a second area associated with target PGW 230. An area may refer to a geographic area, a coverage area served by a set of base stations 220, or the like. In some implementations, MME 240 may determine that user device 210 has moved from the first area to the second area based on the user device providing location information, such as global positioning system (GPS) information, base station triangulation information, base station trilateration information, cell global identity (CGI) information, eCGI information, or the like. Additionally, or alternatively, MME 240 may determine that user device 210 has moved based on other information, such as information identifying which base station 220 user device 210 is utilizing to connect to provider network 270, or the like.

In some implementations, MME 240 may determine that user device 210 has entered the area associated with target PGW 230 based on user device 210 satisfying a threshold movement. For example, when a geo-fence defines a border between the first area associated with initial PGW 230 and the second area associated with target PGW 230, MME 240 may determine that user device 210 has crossed the geo-fence into the second area for a quantity of time satisfying a threshold, that user device 210 has crossed the geo-fence by a particular distance satisfying a threshold, or the like. Additionally, or alternatively, MME 240 may reject a movement to a second location that does not satisfy a threshold time, a threshold distance, or the like. In some implementations, MME 240 may determine that user device 210 has moved from a first area to a second, adjacent area. For example, MME 240 may determine that user device 210 has crossed a geo-fence into another area. Additionally, or alternatively, MME 240 may determine that user device 210 has moved from a first area to a second, non-adjacent area.

As further shown in FIG. 4, process 400 may include determining to switch the user device from a first connection with the initial PGW to a second connection with the target PGW (block 420). For example, MME 240 may determine to handoff user device 210 from initial PGW 230 to target PGW 230. A handoff, a handover, or another similar term may refer to a set of signals associated with causing bearers that route network traffic from an initial PGW 230 to user device 210 to be dropped and causing the bearers to be replaced by other bearers that route the network traffic from a target PGW 230 to user device 210. The network traffic may include streaming music, streaming video, web content, and/or another type of data that may be routed from an application server to user device 210 via PGW 230.

In some implementations, MME 240 may reject a handoff, despite user device 210 entering an area associated with target PGW 230, based on a network usage by user device 210 (e.g., user device 210 actively sending data to and/or receiving data from an application server, user device 210 utilizing a virtual private network (VPN) connection, etc.). For example, when user device 210 is receiving streaming music from an application server via initial PGW 230, MME 240 may avoid causing a handoff until the streaming music connection ends. In this way, MME 240 may avoid causing an interruption to the streaming music, thereby improving the user experience. Additionally, or alternatively, MME 240 may permit a handoff while user device 210 is actively sending data to and/or receiving data from an application server. For example, MME 240 may determine that continued usage of initial PGW 230 to route traffic from the application server to user device 210 is causing a threshold reduction in network performance, and MME 240 may force a handoff during traffic routing to improve the network performance.

In some implementations, MME 240 may determine to cause a handoff based on an availability of network resources associated with target PGW 230. For example, MME 240 may determine that target PGW 230 is capable of establishing a bearer for routing network traffic to user device 210, and may permit the handoff based on determining that target PGW 230 is capable of establishing the bearer. Additionally, or alternatively, MME 240 may reject the handoff when MME 240 determines that target PGW 230 lacks network resources sufficient to establish the bearer, when MME 240 determines that establishing the bearer would cause reduced network performance, or the like.

As further shown in FIG. 4, process 400 may include causing the user device to be switched to the second connection with the target PGW without the user device being disconnected from and reconnected to the provider network (block 430). For example, MME 240 may cause user device 210 to connect to target PGW 230. In some implementations, MME 240 may cause the first connection between user device 210 and initial PGW 230 to be disconnected when connecting user device 210 to target PGW 230. For example, MME 240 may cause initial PGW 230 to remove a bearer associated with routing network traffic to user device 210, to reassign the bearer to serve another user device 210, or the like.

In some implementations, MME 240 may cause the second connection between user device 210 and target PGW 230 to be established when connecting user device 210 to target PGW 230. For example, MME 240 may cause target PGW 230 to utilize a bearer establishment procedure (e.g., an "initial-attach" procedure, or the like) to connect to user device 210. In other words, MME 240 may instruct target PGW 230 to establish the second connection with user device 210, as if user device 210 were requesting an initial network connection on system start-up, but without user device 210 shutting down and restarting, entering an "airplane mode" and exiting the "airplane mode," disconnecting and reconnecting with provider network 270, or the like. In this way, user device 210 and MME 240 need not exchange pre-registration signaling associated with performing an initial connection to a particular PGW 230, thereby reducing signaling associated with moving from initial PGW 230 to target PGW 230.

In some implementations, MME 240 may provide information to SGW 260 to cause user device 210 to be connected to target PGW 230. For example, MME 240 may provide information to SGW 260 instructing SGW 260 to perform a bearer attachment procedure without user device 210 shutting down and restarting. Additionally, or alternatively, MME 240 may provide information to SGW 260 indicating that user device 210 is to be connected to target PGW 230, and SGW 260 may subsequently update routing information to reflect user device 210 connecting to target PGW 230.

In some implementations, MME 240 may provide information to HSS 250 identifying target PGW 230 as being associated with routing network traffic to user device 210. For example, MME 240 may cause HSS 250 to update subscriber profile stored information (e.g., a fully qualified domain name (FQDN), an Internet protocol (IP) address, or the like) to reflect that user device 210 is connected to target PGW 230 and disconnected from initial PGW 230. Additionally, or alternatively, MME 240 may provide information to one or more other devices, such as a device associated with billing, authentication, etc., an application server, or the like, indicating that user device 210 is utilizing a connection with target PGW 230.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E show an example of managing a PGW handoff.

Figure 5A:
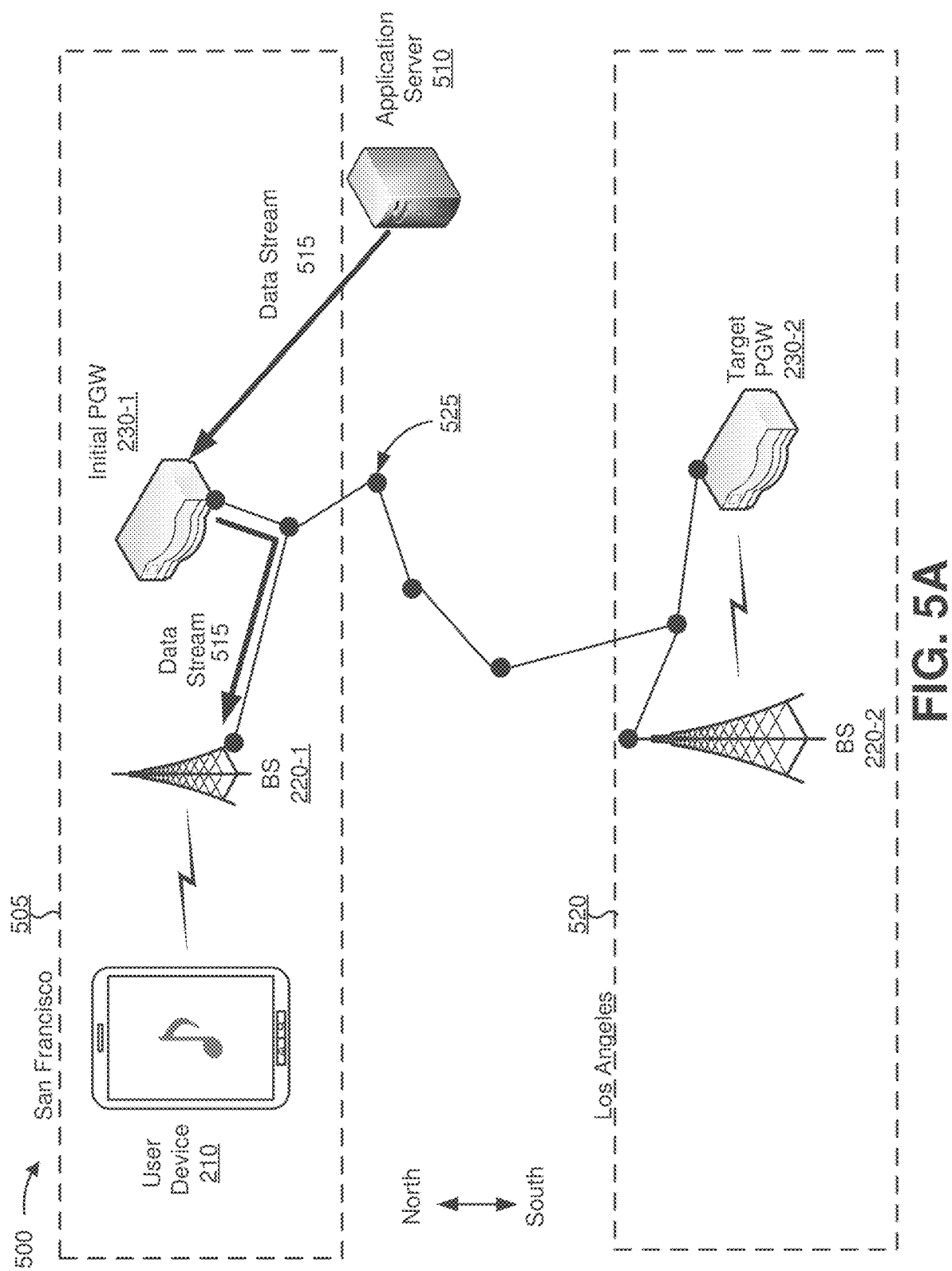
FIGS. 5A-5E are diagrams of an example implementation of managing a packet data network gateway handoff.

As shown in FIG. 5A, and by reference number 505, user device 210 may be located in a first area (e.g., San Francisco). The first area may include initial PGW 230-1 that services the first area and base station 220-1 ("BS 220-1") that provides network coverage to the first area. User device 210 may receive, from application server 510, data stream 515 (e.g., a music stream conveying streaming music) via initial PGW 230-1 and base station 220-1. As shown by reference number 520, a second area (e.g., Los Angeles) may include target PGW 230-2 and base station 220-2 ("BS 220-2"). Initial PGW 230-1, base station 220-1, target PGW 230-2, and base station 220-2 may connect via a set of network nodes 525 (e.g., network devices associated with a provider network).

Figure 5B:
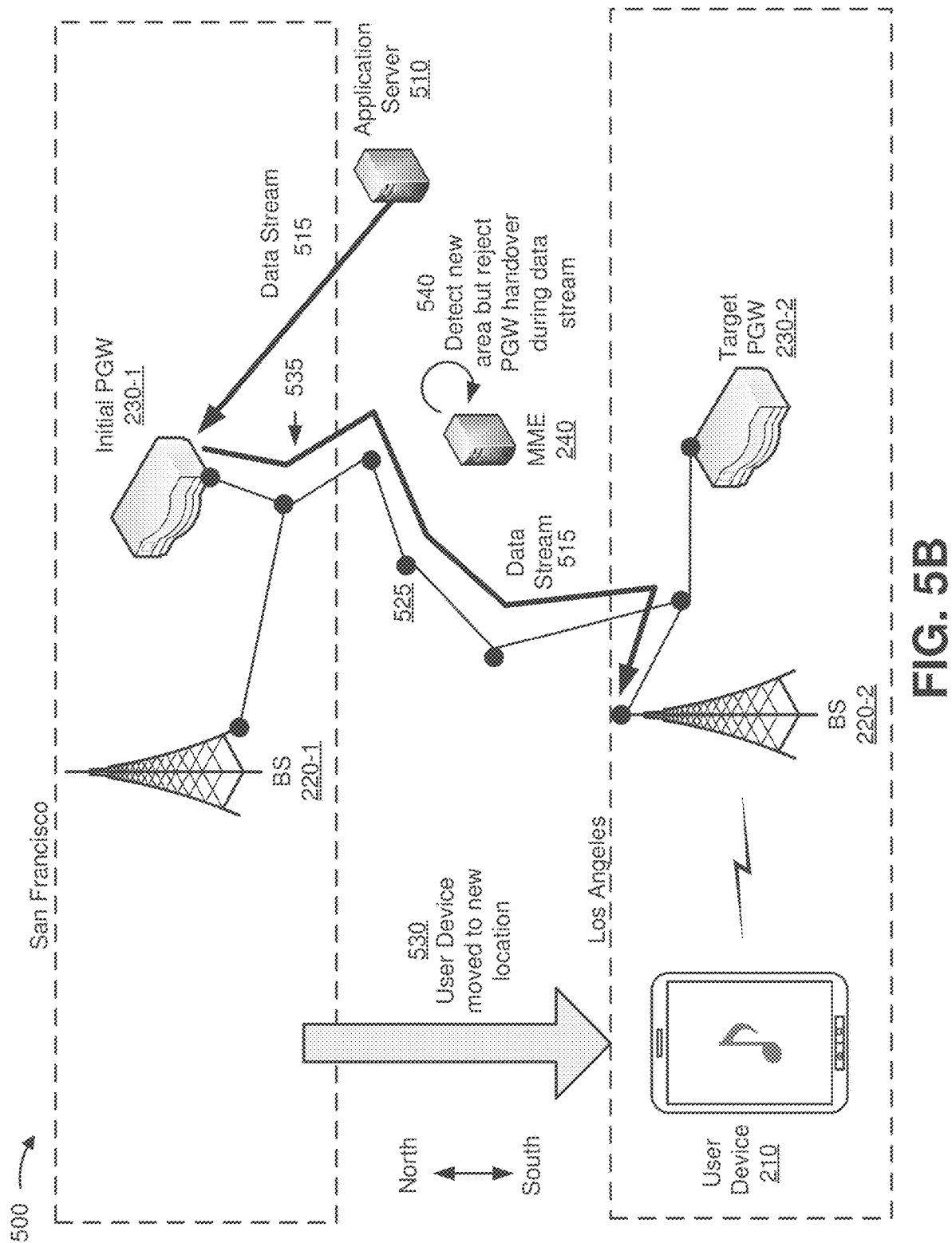

As shown in FIG. 5B, and by reference number 530, user device 210 moves from San Francisco to Los Angeles. Assume that user device 210 is not disconnected and continues receiving data stream 515 while moving from San Francisco to Los Angeles. Further assume that user device 210 undergoes a handoff from base station 220-1 to base station 220-2 via base station handoff procedures. As shown by reference number 535, data stream 515 is routed from application server 510 to initial PGW 230-1, from initial PGW 230-1 to base station 220-2 (e.g., via the set of network nodes 525), and from base station 220-2 to user device 210. As shown by reference number 540, MME 240 detects that user device 210 has left the first area (San Francisco) and entered the second area (Los Angeles), but rejects performing a PGW handoff while application server 510 is providing data stream 515 to user device 210.

Figure 5C:
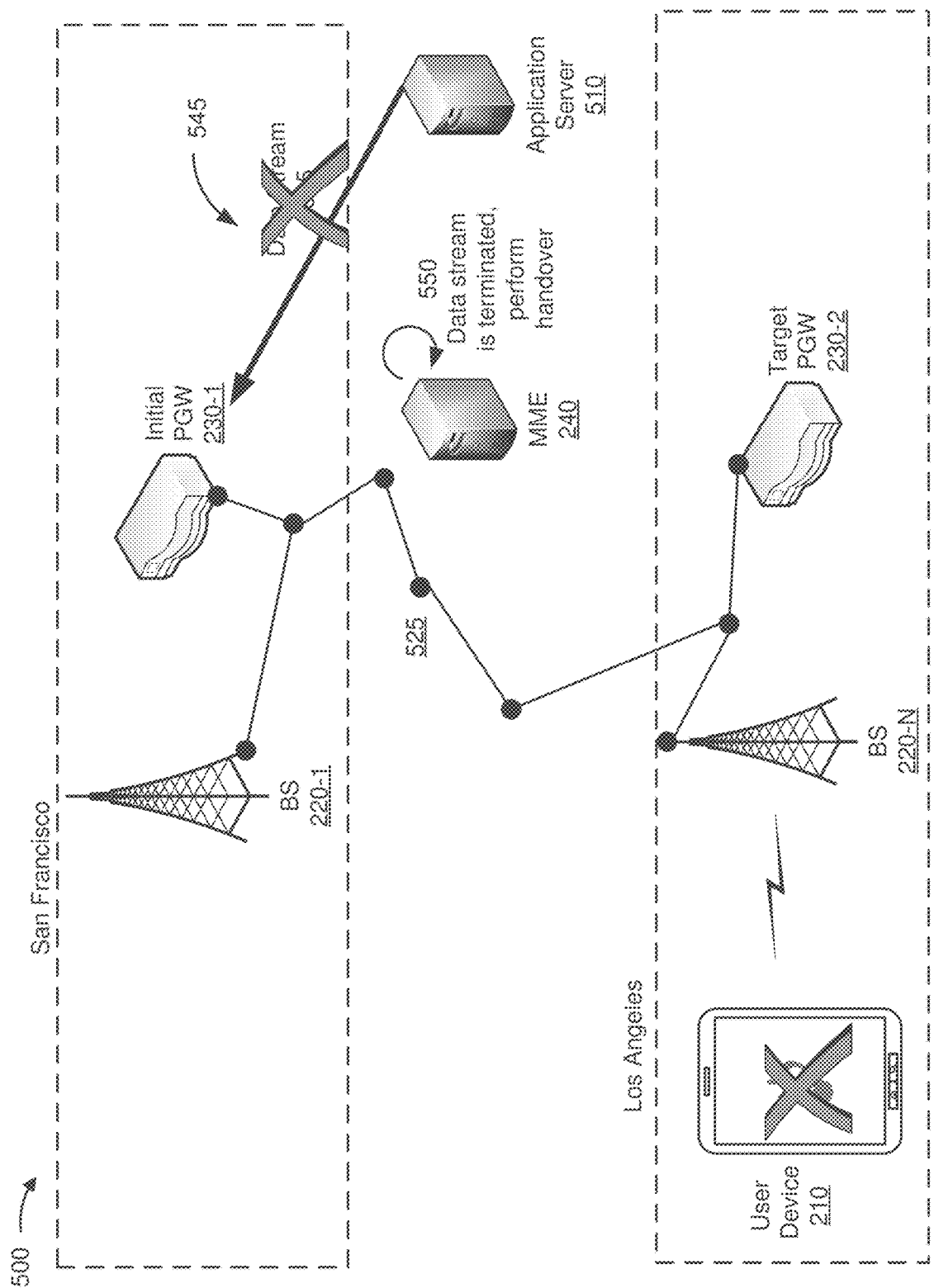

As shown in FIG. 5C, and by reference number 545, data stream 515 is terminated (e.g., a user of user device 210 elects to temporarily halt receiving the streaming music). As shown by reference number 550, MME 240 determines that the data stream is terminated, which triggers a determination of whether a PGW handoff is to be performed for user device 210. Assume that MME 240 determines that a PGW handoff is to be performed for user device 210.

Figure 5D:
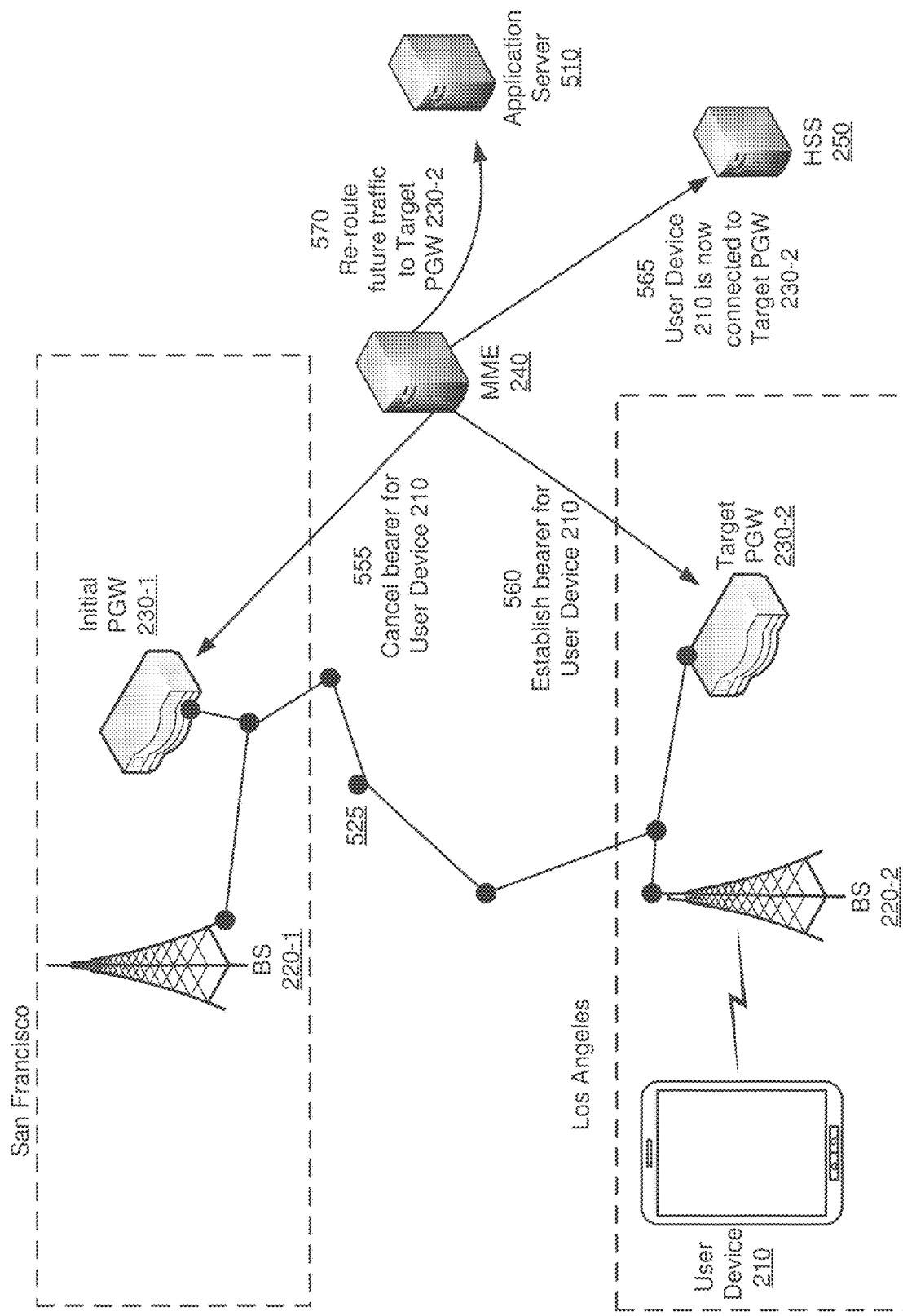

As shown in FIG. 5D, and by reference number 555, MME 240 instructs initial PGW 230-1 to cancel a bearer associated with routing network traffic to user device 210 (e.g., a bearer that was utilized to route data stream 515). As shown by reference number 560, MME 240 instructs target PGW 230-2 to establish a bearer associated with routing network traffic to user device 210. Assume that target PGW 230-2 utilizes bearer establishment procedures associated with establishing a bearer on initial startup by user device 210. As shown by reference number 565, MME 240 sends information to HSS 250 indicating that user device 210 is connected to target PGW 230-2 and disconnected from initial PGW 230-1. Assume that MME 240 causes user device 210 to be disconnected from initial PGW 230-1 and connected to target PGW 230-2 without disconnecting user device 210 from provider network 270. As shown by reference number 570, MME 240 sends a message to application server 510 indicating chat future traffic is to be routed to user device 210 via target PGW 230-2. In another example, application server 510 may receive information indicating that traffic is being routed via target PGW 230-2 when user device 210 re-connects to application server 510 to send/receive data.

Figure 5E:
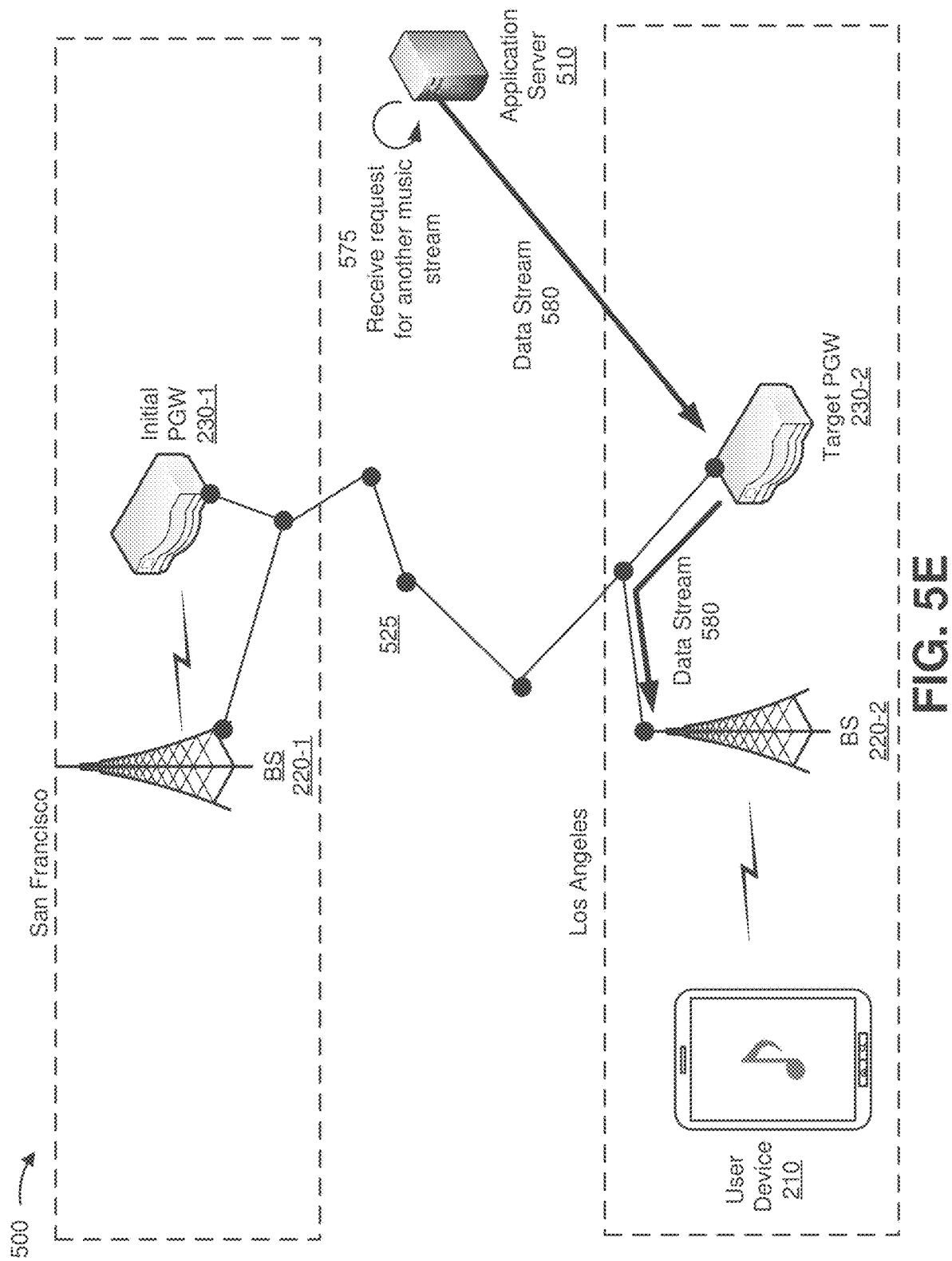

As shown in FIG. 5E, and by reference number 575, application server 510 receives a request for another music stream (e.g., a request from user device 210). Application server 510 provides data stream 580 (e.g., another music stream conveying streaming music) to target PGW 230-2. Target PGW 230-2 routes data stream 580 to user device 210 via base station 220-2 and without routing data stream 580 via the set of nodes 525 that connect San Francisco and Los Angeles, thereby reducing the quantity of nodes 525 that are traversed by data stream 580.

As indicated above, FIGS. 5A-5E are provided merely as an example. Other examples are possible and may differ from what was described with regard to FIGS. 5A-5E.

Figure 6:
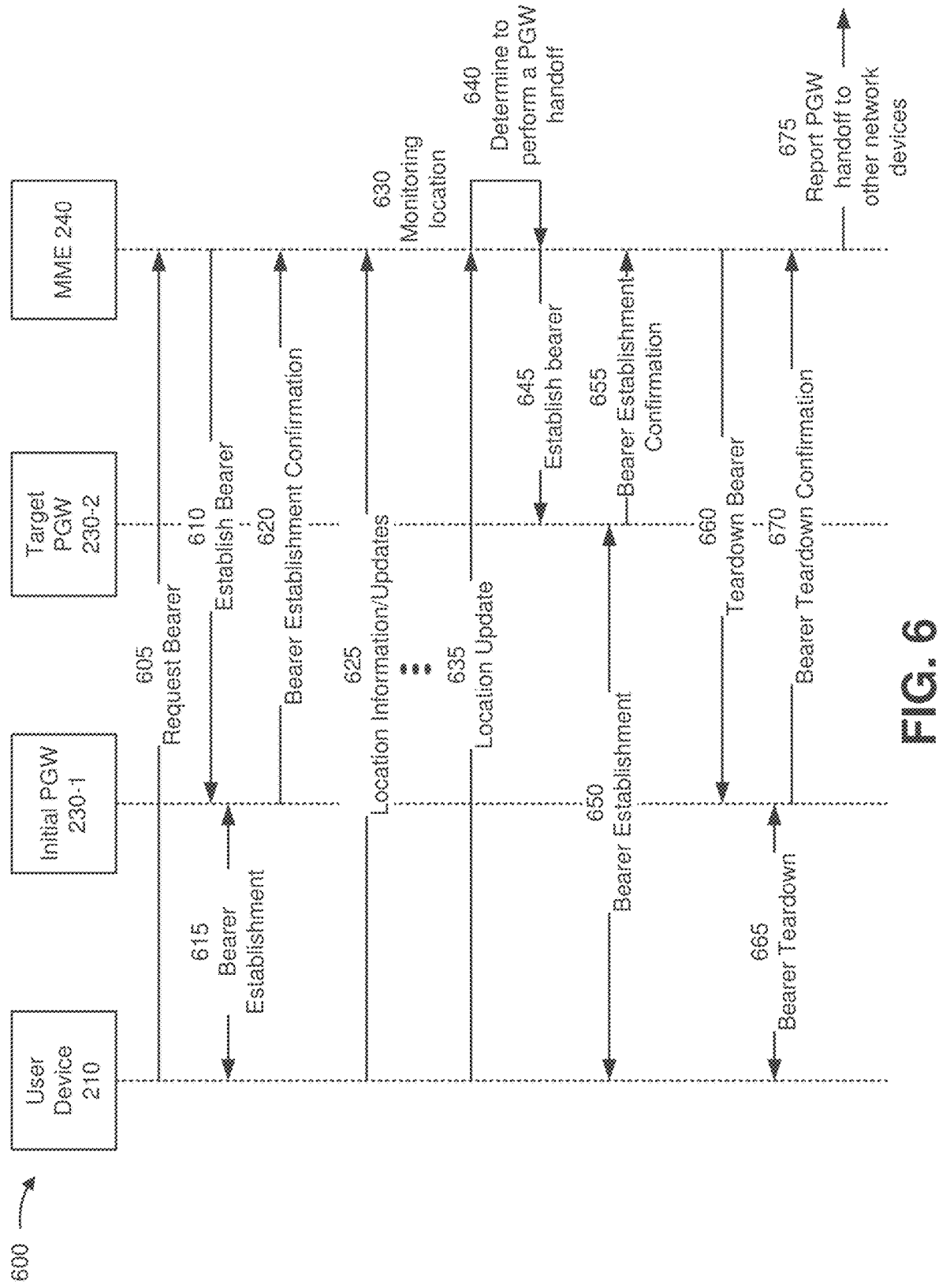
FIG. 6 is a call flow diagram relating to the example process shown in FIG. 4.

FIG. 6 is a call flow diagram of an example process 600 for managing a packet data network gateway handoff. In some implementations, one or more operations of FIG. 6 may be performed by one or more devices of environment 200.

As shown in FIG. 6, process 600 may include requesting a first bearer (as shown by reference number 605). For example, MME 240 may receive, from user device 210, a request for a first bearer. MME 240 may determine that initial PGW 230-1 is associated with providing connectivity to other user devices 210 in an area that includes user device 210, and may select initial PGW 230-1 for establishing the first bearer.

As further shown in FIG. 6, process 600 may include causing the first bearer to be established (as shown by reference number 610). For example, MME 240 may transmit information to initial PGW 230-1 instructing PGW 230-1 to establish the first bearer with user device 210.

As further shown in FIG. 6, process 600 may include performing bearer establishment (as shown by reference number 615). For example, initial PGW 230-1 and user device 210 may exchange one or more messages to establish the first bearer based on MME 240 instructing initial PGW 230-1 to establish the first bearer.

As further shown in FIG. 6, process 600 may include receiving a bearer establishment confirmation (as shown by reference number 620). For example, MME 240 may receive a bearer establishment confirmation from initial PGW 230-1 based on initial PGW 230-1 and user device 210 establishing the first bearer.

As further shown in FIG. 6, process 600 may include receiving location information and/or a set of location updates (as shown by reference number 625). For example, MME 240 may receive location information from user device 210 indicating a location of user device 210. MME 240 may receive one or more location updates from user device 210 providing updated location information. As shown by reference number 630, MME 240 may monitor the location of user device 210 based on the one or more location updates.

As further shown in FIG. 6, process 600 may include receiving a particular location update (as shown by reference number 635). For example, MME 240 may receive a particular location update from user device 210. Assume that the particular location update indicates that one or more conditions associated with causing a PGW handoff are satisfied. As shown by reference number 640, based on receiving the particular location update, MME 240 determines to perform a PGW handoff for user device 210.

As further shown in FIG. 6, process 600 may include causing a second bearer to be established (as shown by reference number 645). For example, MME 240 may transmit a message to target PGW 230-2 instructing target PGW 230-2 to establish the second bearer for user device 210.

As further shown in FIG. 6, process 600 may include performing bearer establishment (as shown by reference number 650). For example, target PGW 230-2 and user device 210 may exchange one or more messages to establish the second bearer basal on MME 240 instructing target PGW 230-2 to establish the second bearer.

As further shown in FIG. 6, process 600 may include receiving a bearer establishment confirmation (as shown by reference number 655). For example, MME 240 may receive a bearer establishment confirmation from target PGW 230-2 based on target PGW 230-2 and user device 210 establishing the second bearer.

As further shown in FIG. 6, process 600 may include causing a bearer teardown (as shown by reference number 660). For example, MME 240 may transmit a message to initial PGW 230-1 instructing initial PGW 230-1 to remove the first bearer established for user device 210 by initial PGW 230-1.

As further shown in FIG. 6, process 600 may include performing the bearer teardown (as shown by reference number 665). For example, initial PGW 230-1 and user device 210 may exchange one or more messages to remove the first bearer based on MME 240 instructing initial PGW 230-1 to perform a bearer teardown.

As further shown in FIG. 6, process 600 may include receiving a bearer teardown confirmation (as shown by reference number 670). For example, MME 240 may receive, from initial PGW 230-1, information indicating that PGW 230-1 has removed the First bearer. As shown by reference number 675, based on MME 240 receiving the confirmation that target PGW 230-2 established the second bearer and the confirmation that initial PGW 230-1 removed the first bearer, MME 240 may provide information to one or more other network devices (e.g., HSS 250, SGW 260, an application server, or the like) reporting that the first bearer is removed and the second bearer is established.

Although FIG. 6 shows example operations of process 600, in some implementations, process 600 may include additional operations, fewer operations, different operations, or differently arranged operations than those depicted in FIG. 6. Additionally, or alternatively, two or more operations of process 600 may be performed in parallel.

In this way, MME 240 may reduce network resources utilized to route traffic by ensuring that traffic is not routed to a PGW 230 in an area in which user device 210 is no longer located when another PGW 230 is available to service the area in which user device 210 is located.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   determining, by a device, that a user device associated with a first location is located in a second location,
      the first location being associated with an initial packet data network gateway (PGW) of a provider network,
      the second location being associated with a target PGW of the provider network;
   determining, by the device, that the user device moved from being located at the first location to being located at the second location that is at least a threshold distance from the first location;
      wherein the user device is located at the second location for a threshold amount of time;
   determining, by the device and based on determining that the user device is located at the second location for the threshold amount of time, that the user device is to be handed off from a first connection with the initial PGW to a second connection with the target PGW; and
   causing, by the device, one or more bearers associated with the first connection to be dropped and one or more bearers associated with the second connection to be established, based on determining that the user device moved from being located at the first location to being located at the second location that is at least at the threshold distance from the first location and for the threshold amount of time,
      the user device remaining connected to the provider network when disconnecting from the initial PGW and connecting to the target PGW,
      the target PGW being established without an initial startup,
      the first connection being dropped and the second connection being established after the user device finishing streaming network traffic via the initial PGW, and
      the first connection being dropped and the second connection being established prior to finishing the streaming of the network traffic via the initial PGW based on a threshold reduction in network performance.

2. The method of claim 1, further comprising:
   rejecting a handoff between the initial PGW and the target PGW for a second user device based on a network usage of the second user device.

3. The method of claim 1, further comprising:
   permitting a handoff between the initial PGW and the target PGW while the user device is actively sending data and/or receiving data from an application server.

4. The method of claim 1, further comprising:
   rejecting a handoff between the initial PGW and the target PGW for a second user device based upon network resources of the target PGW.

5. The method of claim 1, where causing the target PGW to establish the one or more bearers for routing the network traffic to the user device comprises:

providing information associated with causing the target PGW and a serving gateway (SGW) associated with the target PGW to exchange a set of messages associated with establishing the one or more bearers for routing the network traffic to the user device.

6. The method of claim 1, further comprising:
determining that the user device has moved from the first location to the second location based on one or more of:
global positioning system (GPS) information,
base station triangulation information,
base station trilateration information,
cell global identity (CGI) information, or
eCGI information.

7. The method of claim 1, further comprising:
receiving one or more location updates associated with the user device; and
monitoring a location of the user device based on the one or more location updates.

8. A device, comprising:
one or more memories; and
one or more processors, communicatively coupled to the one or more memories, to:
determine that a user device, connected to a first network device associated with a first location, is located in a second location associated with a second network device,
the first network device being associated with a provider network,
the second network device being associated with the provider network,
the user device not being connected to the second network device;
determine that the user device moved from being located at the first location to being located at the second location that is at least a threshold distance from the first location,
wherein the user device is located at the second location for a threshold amount of time; and
cause the user device to be disconnected from the first network device and connected to the second network device based on determining that the user device moved from being located at the first location to being located at the second location that is at least the threshold distance from the first location and for the threshold amount of time,
the user device remaining connected to the provider network when disconnecting from the first network device and connecting to the second network device,
the second network device being established without an initial startup,
the user device being disconnected from the first network device and connected to the second network device after the user device has finished streaming network traffic via the first network device, and
the user device being disconnected from the first network device and connected to the second network device prior to finishing the streaming of the network traffic via the first network device based on a threshold reduction in network performance.

9. The device of claim 8, where the one or more processors, when causing the user device to be disconnected from the first network device, are to:
transmit a message to the first network device instructing the first network device to remove one or more bearers associated with routing network traffic to the user device.

10. The device of claim 8,
where the one or more processors, when causing the user device to be disconnected from the first network device and connected to the second network device, are to:
cause the user device to be disconnected from the first network device and connected to the second network device based on determining that the user device is located in the second location for the threshold amount of time.

11. The device of claim 8, where the one or more processors, when causing the user device to be disconnected from the first network device and connected to the second network device, are to:
cause the first network device to drop one or more bearers associated with routing network traffic to the user device.

12. The device of claim 8, where the one or more processors, when causing the user device to be disconnected from the first network device and connected to the second network device, are to:
cause the second network device to establish one or more bearers for routing network traffic to the user device.

13. The device of claim 12, where the first network device is a first packet data network gateway (PGW),
where the second network device is a second PGW, and
where the one or more processors, when causing the second network device to establish the one or more bearers for routing the network traffic to the user device, are to:
provide information associated with causing the second PGW and a serving gateway (SGW) associated with the second PGW to exchange a set of messages associated with establishing the one or more bearers for routing the network traffic to the user device.

14. The device of claim 8, where the one or more processors are further to:
determine that the user device has moved from the first location to the second location based on one or more of:
global positioning system (GPS) information,
base station triangulation information,
base station trilateration information,
cell global identity (CGI) information, or
eCGI information.

15. A non-transitory computer-readable medium storing instructions, the instructions comprising:
one or more instructions that, when executed by one or more processors, cause the one or more processors to:
determine that a user device, connected to a first packet data network gateway (PGW) associated with a first location, is located in a second location associated with a second PGW,
the user device not being connected to the second PGW;
determine that the user device moved from being located at the first location to being located at the second location that is at least a threshold distance from the first location;
determine that the user device is located in the second location for a threshold amount of time,
wherein the user device is located at the second location for the threshold amount of time; and
cause the user device to be disconnected from the first PGW and connected to the second PGW based on determining that the user device moved from being located at the first location to being located at the second location that is at least at the threshold distance from the first location and for the threshold amount of time,
the user device being disconnected from the first PGW and connected to the second PGW without being disconnected from a provider network,
the second PGW being established without an initial startup,
the user device being disconnected from the first PGW and connected to the second PGW after the user device has finished streaming network traffic via the first PGW, and
the user device being disconnected from the first PGW and connected to the second PGW prior to finishing the streaming of the network traffic via the first PGW based on a threshold reduction in network performance.

16. The non-transitory computer-readable medium of claim 15, where the one or more instructions, that cause the one or more processors to cause the user device to be disconnected from the first PGW and connected to the second PGW, cause the one or more processors to:
transmit a message to the first PGW instructing the first PGW to remove one or more bearers associated with routing network traffic to the user device.

17. The non-transitory computer-readable medium of claim 15, where the one or more instructions, when executed by the one or more processors, further cause the one or more processors to:
reject a handoff between the first PGW and the second PGW for a second user device based upon at least one of:
network resources of the second PGW, or
network usage of the second user device.

18. The non-transitory computer-readable medium of claim 15, where the one or more instructions, that cause the one or more processors to cause the user device to be disconnected from the first PGW and connected to the second PGW, cause the one or more processors to:
cause the first PGW to drop one or more bearers associated with routing network traffic to the user device.

19. The non-transitory computer-readable medium of claim 18, where the one or more instructions, that cause the one or more processors to cause the second PGW to establish the one or more bearers for routing the network traffic to the user device, cause the one or more processors to:
provide information associated with causing the second PGW and a serving gateway (SGW) associated with the second PGW to exchange a set of messages associated with establishing the one or more bearers for routing the network traffic to the user device.

20. The non-transitory computer-readable medium of claim 15, where the one or more instructions, when executed by the one or more processors, further cause the one or more processors to:
determine that the user device has moved from the first location to the second location based on one or more of:
global positioning system (GPS) information,
base station triangulation information,
base station trilateration information,
cell global identity (CGI) information, or
eCGI information.

\* \* \* \* \*